Jan. 15, 1935.  H. A. S. HOWARTH  1,987,937
BEARING
Filed April 27, 1931  3 Sheets-Sheet 1

Inventor
Harry A. S. Howarth.
By
Cameron, Kerkam + Sutton.
Attorneys

Jan. 15, 1935.  H. A. S. HOWARTH  1,987,937
BEARING
Filed April 27, 1931  3 Sheets-Sheet 2

Inventor
Harry A. S. Howarth.
By Cameron, Kerkam & Sutton
Attorneys.

Jan. 15, 1935.  H. A. S. HOWARTH  1,987,937
BEARING
Filed April 27, 1931   3 Sheets-Sheet 3
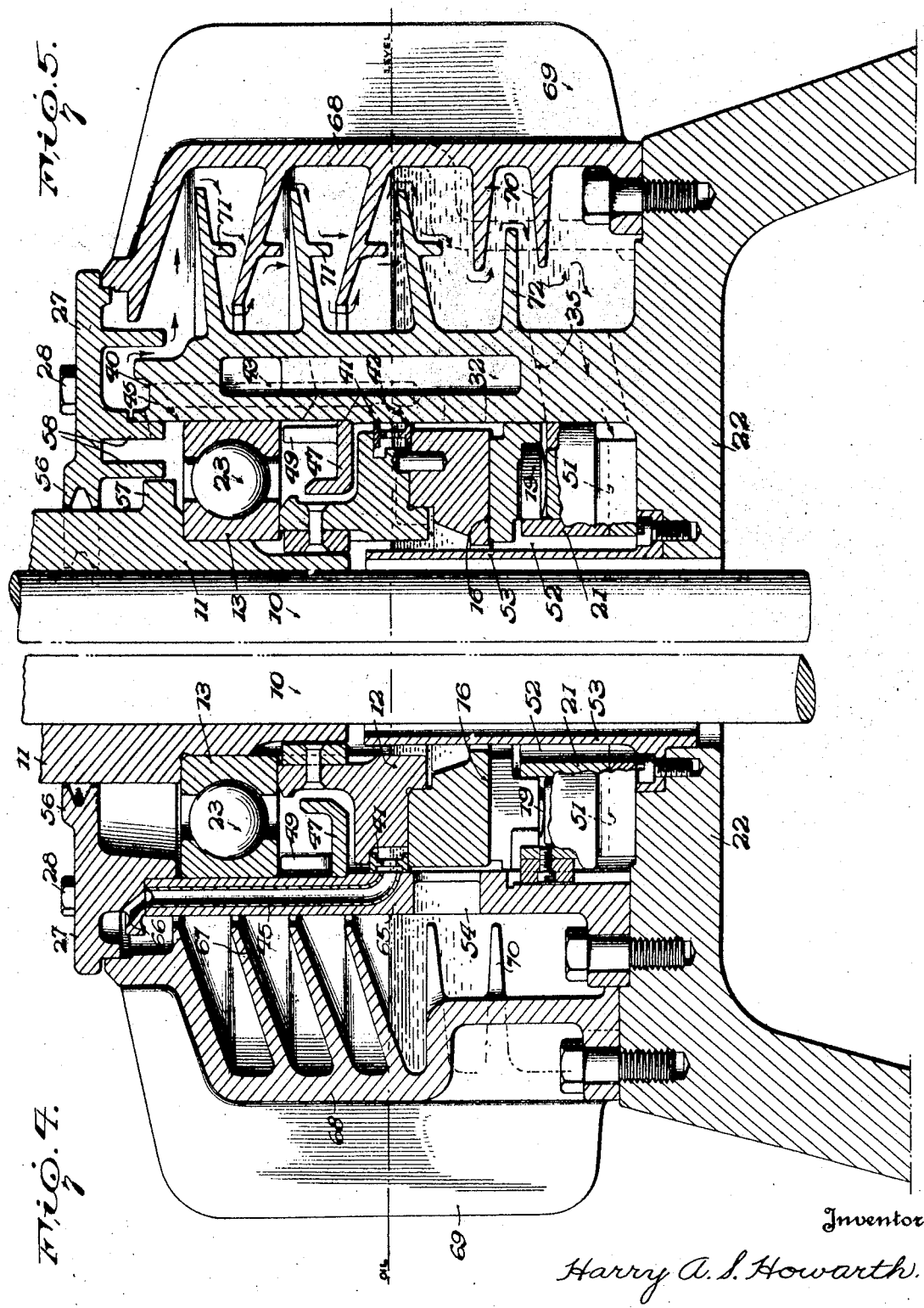

Patented Jan. 15, 1935

1,987,937

UNITED STATES PATENT OFFICE 1,987,937

BEARING

Harry A. S. Howarth, Frankford, Pa., assignor to Kingsbury Machine Works, Inc., Philadelphia, Pa., a corporation of Delaware Application April 27, 1931, Serial No. 533,272

29 Claims. (Cl. 308—76)

This invention relates to bearings, and more particularly to thrust bearings or combined thrust and guide, steady or other radial bearings.

It is an object of this invention to provide a novel method for abstracting and dissipating the heat generated by a thrust bearing during operation.

Another object of this invention is to provide a novel method for abstracting and dissipating heat generated by a thrust bearing during operation by causing the oil to flow in relatively thin films over one or a plurality of surfaces before mingling with the body of the oil in the well.

Another object of this invention is to provide a thrust bearing with improved means for conducting away the heat that is generated during operation of the bearing.

Another object of this invention is to provide a thrust bearing with highly efficient means for cooling the oil above the level of the body of oil in which the thrust bearing elements are immersed.

Another object of this invention is to provide a thrust bearing with cooling means which may act to abstract heat directly from the bearing members by conduction as well as by contact with the lubricating oil.

Another object of this invention is to provide a thrust bearing with means whereby a substantial portion of the lubricating oil is cooled by cascading it over a relatively cold surface so as to effectively reduce the average temperature of the entire body of oil by mingling the cascaded oil therewith.

Another object of this invention is to provide a thrust bearing with means whereby the oil is cooled by cascading it over one or more surfaces which are water-cooled or air-cooled or both.

Another object of this invention is to provide a thrust bearing with means whereby the oil is caused to flow in thin films over one or a plurality of surfaces, which may be either air-cooled or water-cooled or both, and which may take the form of successive trough-like elements.

Another object of this invention is to provide a combined thrust and radial bearing with improved cooling means which abstracts heat both from the journal and the thrust bearing, and which accomplishes any or all of the foregoing objects.

Another object of this invention is to provide a combined thrust and radial bearing with improved cooling means which abstructs heat from the radial bearing by direct conduction.

Another object of this invention is to provide a combined thrust and radial bearing wherein the radial bearing takes the form of a ball or roller bearing and is disposed entirely above the level of the oil in the oil well and wherein friction is reduced to a minimum and yet the radial bearing is copiously lubricated by oil from the oil well.

Another object of this invention is to provide an improved combined thrust and radial bearing wherein the radial bearing is of the ball or roller type and is mounted in unitary relationship with the thrust bearing from the base of the oil pot or well and is independent of the size or construction of the bearing housing or external wall of the oil pot or well.

Another object of this invention is to provide a combined thrust and radial bearing with improved means for preventing dirt from the radial bearing from getting into the oil flowing to the thrust bearing surfaces.

Another object of this invention is to provide a combined thrust and radial bearing with a cover which cooperates to hold the bearing parts against undue vertical displacement.

Other objects of the invention will appear as the description of the invention proceeds.

The invention is capable of receiving a variety of mechanical expressions, some of which are shown on the accompanying drawings, but it is to be expressly understood that the drawings are for purposes of illustration only, and are not to be construed as a definition of the limits of the invention, reference being had to the appended claims for that purpose.

In the drawings, wherein the same reference characters are employed to designate corresponding parts in the several figures, Fig. 1 is an axial section of a combined thrust and radial bearing embodying a simple form of the present invention, some of the parts being indicated more or less diagrammatically for convenience of illustration;

Fig. 4 is a half axial section illustrating another embodiment of the present invention; and Fig. 5 is a half axial section illustrating another embodiment of the invention incorporating features from both of the embodiments of Figs. 3 and 4.

Figure 1:
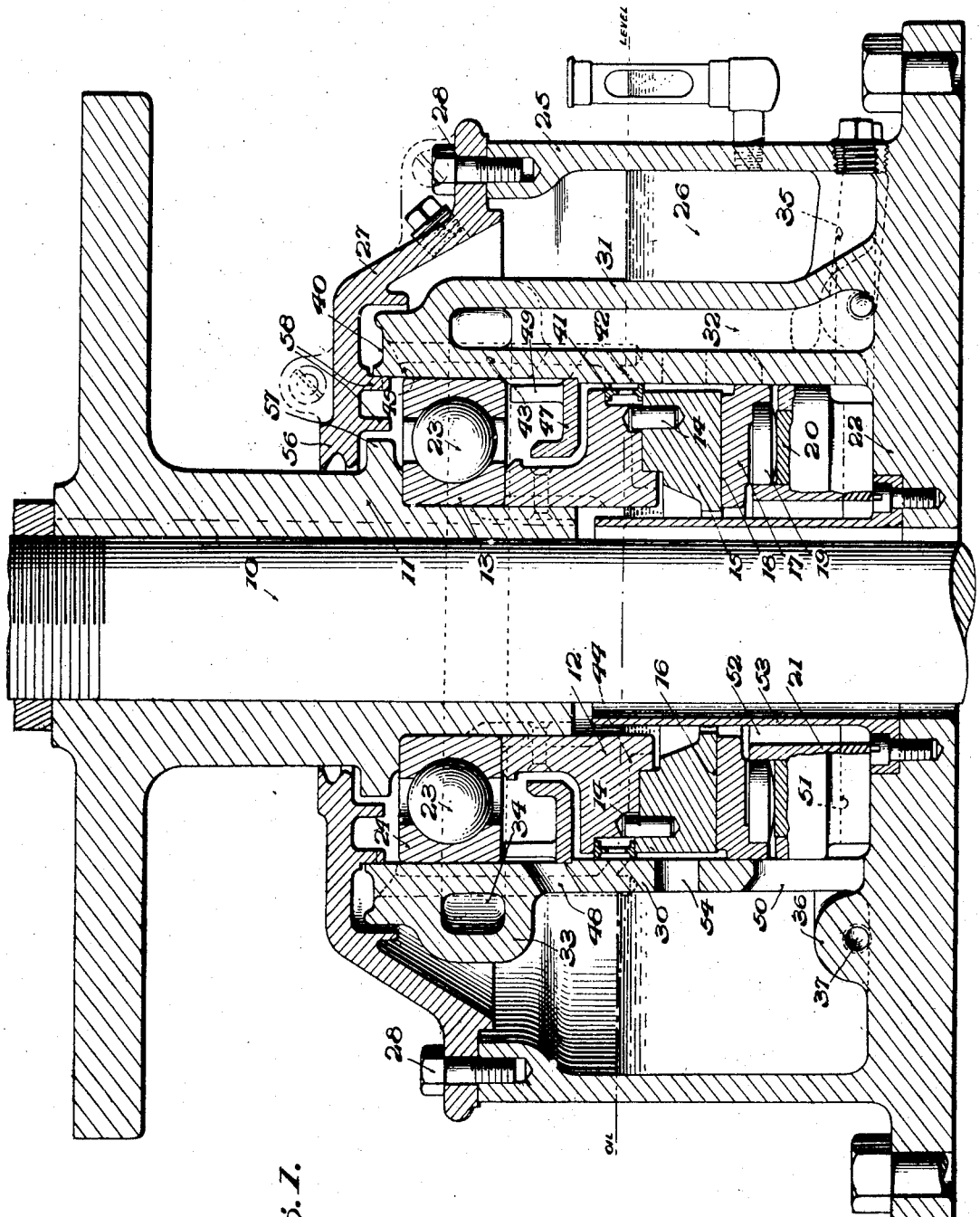
Figure 2:
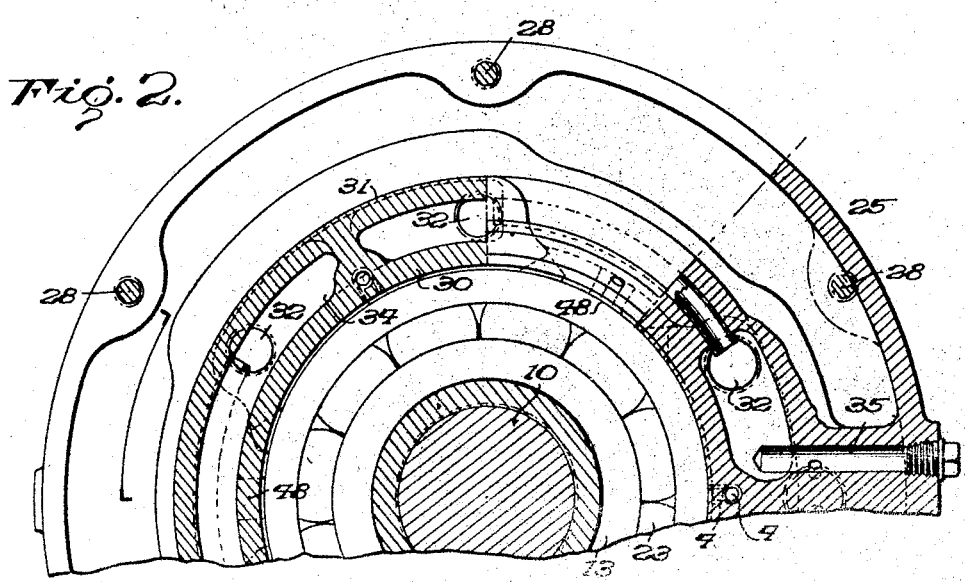
Fig. 2 is a fragmentary radial section of the embodiment of Fig. 1 to illustrate the arrangement and location of the chambers and passages for the cooling water.

In the form shown in Figs. 1 and 2, any suitable shaft 10 has mounted thereon and rotatably secured thereto in any suitable way a flanged coupling hub 11 to which is keyed, threadedly attached or otherwise suitably fixed a thrust block 12. When the invention is embodied in a combined thrust and radial bearing the hub 11 may also carry the relatively rotatable member of the radial bearing which may be of any suitable construction whether of the oil film or ball or roller types. As shown, a ball race 13 is carried by the hub 11 between the thrust block 12 and a shoulder or flange on the hub.

Suitably attached to the thrust block 12 as by dowel pins 14 is any suitable thrust collar 15 having a bearing surface 16. Cooperating with the bearing surface 16 of the thrust collar 15 is a stationary thrust bearing member or group of bearing members, which may be of any suitable type, construction and form. As shown, the stationary thrust bearing member is composed of a plurality of circumferentially and radially tiltable shoes 17 having bearing surfaces 18 and carrying spherically faced blocks 19 which may be mounted on any suitable surface or structure to permit the bearing shoes to tilt both circumferentially and radially so that the proper bearing films are created and maintained between the bearing surfaces 16 and 18. By preference, the bearing shoes are mounted on a suitable structure for equalizing the pressure between the several bearing shoes, the form shown comprising a series of bridged and relatively tiltable equalizing blocks 20 of a character well known to the art and mounted in a channel-shaped retaining ring 21, shown as supported on the base 22 of the bearing structure. It is to be expressly understood, however, that the illustrated thrust bearing is to be taken as typical of any suitable thrust bearing construction, as the invention is not limited to the use of a thrust bearing of any particular type, form or construction.

As shown, the radial bearing is a ball bearing including, in addition to the rotatable raceway 13, a suitable series of balls 23 and a relatively stationary raceway 24 supported in the bearing structure in any suitable manner. Here again, the ball bearing is to be taken as typical of any suitable guide, steady or other radial bearing, as the invention does not require the use of any particular form of radial bearing, and the relatively rotatable members may with equal facility take the form of surface bearing members, including sleeves, shoes, etc. However, certain features of the present invention have particular reference to combined thrust and radial bearings of the ball or roller type. It is also to be expressly understood that as respects certain features of the invention the radial bearing may be omitted, as some of the advantages of the present invention would be obtained if a thrust bearing per se were equipped with the novel cooling method and means hereinafter described.

The base or foundation 22 is provided with an oil retaining wall 25 of any suitable size and construction, so as to provide an oil well 26 to receive and retain a body of oil in which the bearing surfaces of the thrust bearing are normally submerged. Said oil retaining means may be either integral with or separately attached to the foundation 22. As shown, a cover 27 is also provided for enclosing the bearing members, being retained on the wall 25 in any suitable way as by bolts 28.

In conformity with the present invention the thrust bearing or combined thrust and radial bearing is provided within the oil well with a water cooled wall. Said wall may be of any suitable construction. As shown, said wall comprises a cylindrical wall 30 having an interior diameter which substantially conforms with the exterior diameter of the stationary thrust bearing member 17. Said wall 30 carries a plurality of circumferentially spaced water chambers formed between the wall 30 and outer wall portions 31, these chambers 32 being spaced circumferentially by portions of the wall 30. For example, there may be three chambers 32 uniformly distributed around the circumference of the wall 30, and these chambers 32 are separated by sections of the wall 30 so that, as illustrated at the left-hand side of the drawing, there is at these latter sections only the one thickness of wall between the portions of the oil well radially within and without the wall 30. The sections of wall separating the chambers 32 are preferably less extensive than the chambers 32, but may if desired be equal to or even greater in circumferential extent than the chambers 32.

In order to place the chambers 32 in communication, the upper part of the wall 30 carries, between the chambers 32, circumferential enlargements 33 within which are formed the passages 34 communicating at each end with the chambers 32, so that water may flow from one chamber to the next. Water may be led into each of the chambers 32 or water may be led into only one or more of said chambers, an inlet passage 35 being shown at the right-hand side of Figure 1. One or more outlet passages for the cooling water (not shown) are also suitably provided, so that water may be introduced into and circulated through the several chambers for abstracting heat from the walls thereof. In order to provide means for draining the chambers 32, constricted passages may be provided between the several chambers at their bottoms. As illustrated, circumferentially extending bosses 36 are provided between the chambers 32 and have pipes 37 cast therein and communicating with the chambers 32 at each end, or the passages could be otherwise formed. Said passages 37 are of such size that little water will circulate therethrough but the chambers 32 can be drained thereby.

The wall 30 with its chambers 32 and passages 34 and 37 may be made separate from the base 22 and suitably mounted on or attached to the base or wall, or even be made in sections with suitable packing if preferred, but to minimize opportunities for leakage of water into the oil it is preferred to make said wall 30 with the parts carried thereby integral with the base 22.

In order to utilize the cooling surface of the inner water cooled wall to a greater extent than is permitted by mere contact of the bearing parts and oil therewith, the upper edge of the wall is provided with a channel 40, and means are provided for pumping oil to said channel 40, so that it will overflow and cascade down the cooled surface or surfaces of the water cooled wall projecting above the main body of oil in the well. Any suitable means may be provided for pumping the oil to the channel 40. As shown, a viscosity pump ring 41 cooperates with the rotatable thrust bearing member within the wall 30, and acts to pump oil through suitable passages 42 and 43 to the channel 40, or ring 41 may be a seal ring and passages 44 supply channel 40. The oil so pumped may be taken from the radially inner side of the bearing members through suitable passages 44 as shown, or if this oil is not to be used in lubricating a radial bearing it will preferably be hot oil flowing from the bearing surfaces, being taken, for example, from the annular space between the bearing members and the wall 30.

When a radial bearing is also used with the thrust bearing the oil pumped to the channel 40 may also be employed for the purpose of lubricating said bearing. Thus, in the form shown, one or more passages 45 formed in the wall 30 lead from the channel 40 to the ball bearing 23, so that the ball bearing parts are copiously lubricated with oil flowing from the channel 40. When a ball or roller bearing is used, this enables the radial bearing to be disposed above the level of the oil so that friction losses are reduced to a minimum and yet the radial bearing is copiously lubricated.

As shown, a ring 47 is preferably formed or mounted on the wall 30 below the ball bearing for the purpose of collecting any metal parts which wear from the relatively moving bearing parts. The catching of these metal parts eliminates the possibility of such metal parts dropping into the ring 41 whether acting as a pump ring or as a seal ring or into the oil that is flowing to the thrust bearing surfaces, such particles being carried to the outer portion of the oil well and deposited therein by the oil flowing from the radial bearing through suitable passages 48. The pan may be provided with upstanding lugs 49 which will engage the radial bearing member 24, when the latter is placed in position if the ring 47 is not in its proper position, whereby the ring will be forced downwardly into its proper relationship to the outflow passages 48.

The portions of the wall 30 intermediate the chambers 32 are provided with suitable apertures or passages to permit the oil to circulate to and from the bearing surfaces in a manner well understood in the art. Thus, as shown, passages 50 in the wall 30 permit oil to flow from the outer portion of the oil well 26, through passages 51 formed in or between the ring 21 and base 22, to the annular space 52 between the oil retaining sleeve 53 and the inner circumference of the bearing members, whence it may flow upwardly to, through and between the relatively rotatable bearing members to lubricate the bearing surfaces thereof. Some of the oil flows to the viscosity pump ring 41 and is pumped to the channel 40, or it may be pumped directly thereto by the centrifugal action of the passages 44, while the remainder of the circulating oil is returned to the outer portion of the oil well through passages 54 in the wall 30. The wall 30 acts in one respect analogously as the apertured baffle plates heretofore placed around the relatively movable bearing members.

From the channel 40 some of the oil flows through the ball bearing and is caught in the ring 47, from which it returns to the oil well through the passages 48. The remainder of the oil pumped to the channel 40 overflows the side or sides of the channel 40 and cascades down the surface or surfaces of the portion of the water cooled wall projecting above the level of the oil in the well. One edge of the channel may be made higher than the other so that the cascading will take place at only one surface of the wall, or the channel may have sides of equal height so that the oil cascades down both surfaces of the wall.

By preference, and as illustrated, the stationary thrust bearing members 17 are in contact with the water cooled wall, and when a radial bearing is also used the relatively stationary member thereof, as 24 in Fig. 1, is also preferably in contact with the water cooled wall. Hence the water cooled wall acts by direct contact with the relatively stationary bearing member or members to abstract heat therefrom by conduction.

Additionally, the water cooled wall is disposed adjacent the bearing members where it is highly effective in abstracting heat from the circulating oil as it comes from the bearing surfaces. The water cooled wall also divides the space filled with oil into inner and outer chambers, and both the inner and outer walls of said wall are effective to abstract heat from the oil as the latter is circulated thereover and therearound. The inner surface of the water cooled wall is especially effective in abstracting heat because the oil within said wall adjacent the periphery of the bearing members is maintained in rapid circulation by reason of the action of the relatively rotatable bearing members thereon, but the oil flowing through the water cooled wall also sets the body of oil radially outside of said wall in circulation, so that the outer surface of said wall is also effective in abstracting heat from the body of circulating oil radially outside of the same.

Furthermore, the oil pumped to the channel 40 and permitted to cascade down the surface or surfaces of the water cooled wall has its temperature materially reduced, because the oil flows as a thin film over the cooled surface or surfaces of the wall projecting above the body of the oil, and hence said wall is highly effective in abstracting heat from the oil. The oil so subjected to this cascade cooling action then lowers the average temperature of the body of oil in the oil well by mingling therewith.

The ball or roller bearing is mounted in unitary relationship with the thrust bearing by means of the water-cooled wall 30, which may be integral with or suitably mounted on the base of the oil pot or well, and hence, the ball or roller bearing can be furnished as a unit with the thrust bearing, while its size and construction can be standardized with relation to the thrust bearing, since its size and construction are entirely independent of the size and construction of the bearing housing or the outer wall of the oil pot or well. This mounting of the ball or roller bearing from the base of the oil pot or well and as a unit with the thrust bearing is of broader application than in conjunction with the use of a water-cooled wall 30, and therefore in its broader aspects, said water-cooled wall 30 may be replaced by any other suitable support or mounting from the base of the oil well or pot, as disclosed and broadly claimed in my Patent No. 1,760,904, granted June 3, 1930, for Bearings.

In a bearing constructed as heretofore described the cover 27 may also cooperate with other parts of the bearing to hold the bearing parts together. In the form shown in Fig. 1 the inner periphery 56 of the cover may be so located and constructed with respect to a flange 57 on the coupling hub 11 that said parts will engage and prevent further displacement of the bearing parts before the thrust block 12 can separate from the dowels 14. Or in conjunction therewith, or as an alternative therefor, one or more vertical flanges on the cover, such as shown at 58, may be extended downwardly for cooperation with a member of the radial bearing, such as 24 in Fig. 1, if the thrust block 12 is threaded onto the coupling hub 11 so as to fixedly retain the inner member 13 of the radial bearing between the thrust block 12 and the shoulder on the hub 11 as heretofore described, in which event undue displacement of the bearing parts will be prevented by the engagement of the flange or flanges 58 with the opposed element of the radial bearing.

Figure 3:
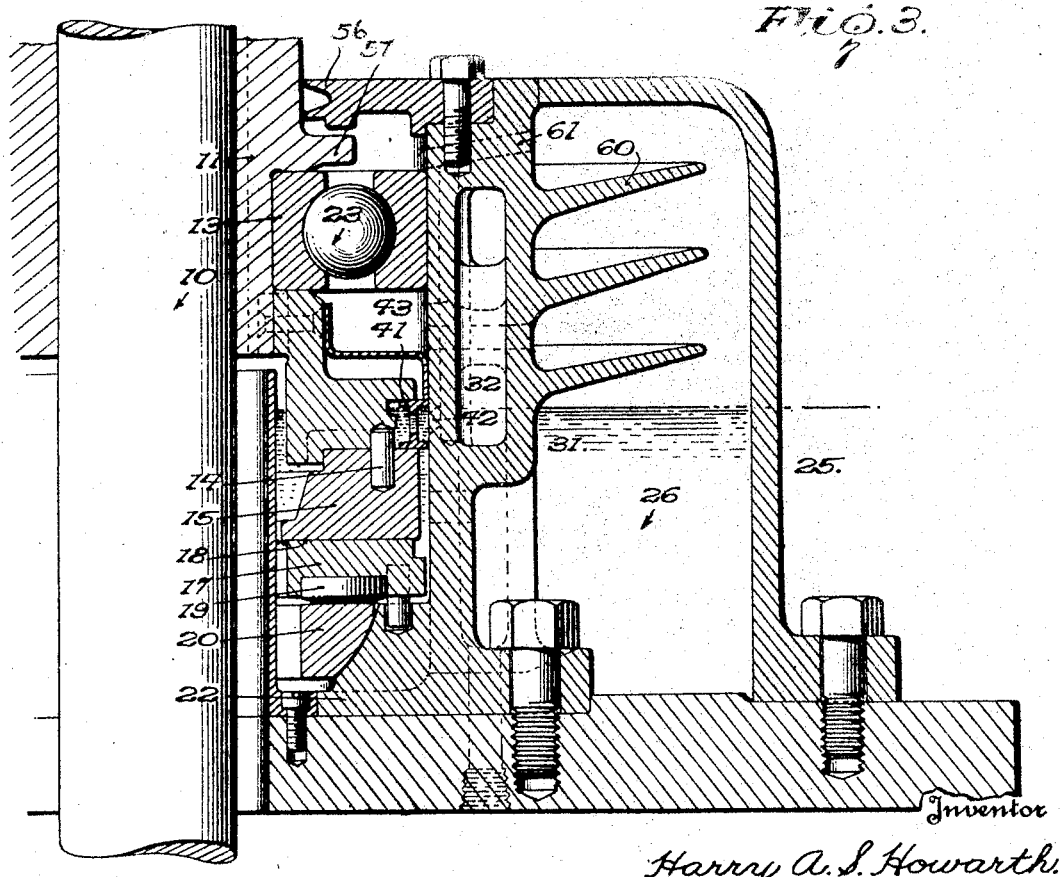
Fig. 3 is a half axial section illustrating another embodiment of the present invention.

In the embodiment of Figs. 1 and 2 cascading oil films are formed on the relatively vertical face or faces of the water-cooled wall 30, but if desired the cooling action of thin oil films can be increased, by providing the water-cooled wall with means whereby the oil is caused to flow over inclined surfaces in a plurality of cascades, as shown in the embodiment of Fig. 3. In the form here shown the water-cooled wall 30 is provided with any suitable number of circumferentially extending ribs 60 which are inclined upwardly at a suitable angle so as to provide shallow troughs or pans having under faces inclined to the horizontal. In this embodiment as shown the trough formed by the upper rib 60 takes the place of the trough 40 formed in the upper surface of the wall 30, but if preferred the oil pumped upwardly by the viscosity pumping ring 41 through the passages 43 may be delivered to a trough in the top of the wall as shown in Fig. 1 instead of through outwardly directed passages 61 as shown in Fig. 3. The ribs or pans are suitably machined and the incline of their bottom surfaces is such that the oil will flow down those surfaces rather than drip from the peripheral edges of the ribs or pans, and therefore the oil pumped upwardly by the pump 41, in excess of that required for the radial bearing when used, is cooled by flowing in thin films over the bottom inclined surfaces of the successive ribs or pans—these ribs or pans being cooled by conduction by reason of their integral formation or close metallic contact with the water-cooled wall 30.

In carrying out the novel method and principle of the present invention the thin cascading oil films may be provided on an air-cooled wall as well as on a water-cooled wall. In the form of the invention shown in Fig. 4 the wall 65 for mounting the combined thrust and radial bearings takes the form of a cylindrical wall or baffle in which, as in the embodiments of Figs. 1 to 3, are provided the passages 43 for conveying the oil upwardly from the pump ring 41 as well as other suitable passages for conveying the oil to and from the thrust bearing, and also the radial bearing when used, as in the other embodiments described. The oil pumped upwardly is shown as delivered to a gutter or channel 66 in the cover, and from here the oil overflows and drops onto the first of a series of inwardly projecting ribs or pans 67 mounted on or integrally attached to the housing 68. As in the embodiment of Fig. 3 the ribs 67 are inclined upwardly so as to form shallow troughs, and they are suitably machined and their under surfaces are suitably inclined so that the oil overflowing the edges thereof will flow down the under surfaces in thin films, rather than drip onto the pans below. Therefore, the oil pumped upwardly by the ring 41, in excess of that used in the radial bearing, is cooled by flowing downwardly in a succession of thin films over ribs which are in metallic contact with or integrally connected to the housing of the bearing which is kept relatively cool by the air circulating thereover, and hence the heat of the oil is conducted through said ribs or pans to the housing from which it is abstracted by the convectional air currents. To increase the efficiency of the air cooling the housing is preferably provided with vertically extending ribs 69 as disclosed and claimed in my Patent No. 1,584,174, granted May 11, 1926, for Air-cooled thrust bearings. The housing may also be provided with inwardly extending ribs 70 below the level of the oil in the well so as to conduct heat from the body of oil therein to the housing for dissipation by means of the circulating air.

If desired the water-cooled wall of Fig. 3 may be combined with the air-cooled wall of Fig. 4 so as to obtain the benefit of both water-cooling and air-cooling for abstracting heat from the relatively thin cascading films of oil. Such a construction is shown in Fig. 5 wherein the water-cooled wall 30, shown as constructed as in the embodiment of Fig. 1, is provided with upwardly inclined pans 60, as in the embodiment of Fig. 3, and the housing 68 is provided with upwardly inclined pans 67, as in the embodiment of Fig. 4, the housing also being provided with vertical fins 69 as in the latter embodiment. In order to prevent the oil flowing the full length of the under faces of the pans carried by the water-cooled wall 30 and the housing 68, the under surfaces of each of said pans is provided with a depending rib 71 to deflect the cascading oil film so that it will run onto the pan immediately below. As in the embodiment of Fig. 4 the housing may be provided with inwardly extending ribs 70 beneath the level of the oil and, if desired, the water-cooled wall may also be provided with one or more outwardly extending ribs 72 to facilitate the conduction of heat from the body of oil to said water-cooled wall. In fact such ribs below the surface of the oil in the well may be used in any of the embodiments heretofore described.

It will, therefore, be perceived that a novel and highly effective cooling means for thrust bearings or for combined thrust and radial bearings has been provided which operates both by conduction and by convection currents in the oil, and which lowers the average temperature of the oil by the highly effective cooling obtained by cascading a part of the oil over one or more cold surfaces. The novel method of cooling a part of the oil by cascading the same over one or more cold surfaces enables a more efficient use of the cooling means and a better cooling of the lubricant, particularly when the oil so cascaded is taken from the hot oil as it leaves the bearing surfaces. The cooling method and means thus provided are available for cooling either thrust bearings per se or combined thrust and radial bearings, and when a radial bearing is used it is efficiently lubricated by oil taken from the oil well.

While the embodiments of the invention illustrated on the drawing have been described with considerable particularity, it is to be expressly understood that the invention is not limited thereto, as the same is capable of receiving a variety of other mechanical expressions, some of which will now readily suggest themselves to those skilled in the art, while changes may be made in the type and construction of thrust bearing and in the type and construction of radial bearing when used, and various other forms of water cooled walls and air cooled walls may be employed, and the cascading principle heretofore described may be utilized in a wide variety of ways, and changes may be made in the details of construction, arrangement and proportion of parts, without departing from the spirit of this invention. Reference is, therefore, to be had to the appended claims for a definition of the limits of said invention.

What is claimed is:

1. In a bearing, in combination with relatively rotatable thrust bearing members and an oil well therefor, a wall surrounding said bearing members within said well and having interior and exterior surfaces which are relatively continuous both circumferentially and axially of the bearing and both of which surfaces are in contact with the oil throughout their circumferences in the vicinity of the bearing, said wall being provided interiorly with means whereby a cooling medium may be circulated therethrough.

2. In a bearing, in combination with relatively rotatable thrust bearing members and an oil well therefor, a vertical wall within said well which is relatively continuous both circumferentially and axially of the bearing, said wall being exteriorly in contact with the oil throughout its circumference and interiorly in heat conducting contact with one of said bearing members and being provided interiorly with means whereby a cooling medium may be circulated therethrough.

3. In a bearing, in combination with relatively rotatable thrust bearing members and an oil well therefor, a wall within said well surrounding said bearing members and provided interiorly with means whereby a cooling medium may be circulated therethrough, said wall having a relatively continuous interior surface both axially and circumferentially of the bearing which provides with said bearing members a relatively narrow annular chamber and said wall being disposed closely adjacent to said bearing members and across the path of the hot oil as it flows from said bearing members whereby the relative rotation of said bearing members causes relatively rapid movement of the hot oil along the cooled surface of said wall as it returns to the well.

4. In a bearing, in combination with relatively rotatable thrust bearing members and an oil well therefor, a wall within said well surrounding said bearing members and provided interiorly with means whereby a cooling medium may be circulated therethrough, said wall having a relatively continuous exterior surface both axially and circumferentially of said bearing and spaced apertures through which the oil is circulated by the relative rotation of said bearing members to entrain and cause circulation of the oil exteriorly of said wall along and in contact with the cooled surface thereof.

5. In a bearing, in combination with relatively rotatable thrust bearing members and an oil well therefor, a wall within said well provided with a trough at its upper edge, said wall being provided with means whereby a cooling medium may be circulated therethrough, and means for pumping oil to said trough to cause it to overflow and cascade down said wall.

6. In a bearing, in combination with relatively rotatable thrust bearing members and an oil well therefor, a wall provided with circumferentially-spaced chambers and immersed in the oil within said well throughout its circumference, and connections whereby a cooling medium may be circulated through said chambers.

7. In a bearing, in combination with relatively rotatable thrust bearing members and an oil well therefor, a wall provided with chambers and located within said well, said wall dividing said well into inner and outer chambers and being provided with a trough at its upper edge, means for pumping oil to said trough whereby it overflows down said wall, and connections whereby a cooling medium may be circulated through said chambers.

8. In a bearing, in combination with relatively movable thrust and radial bearing members, an oil well therefor, a wall located in said well and provided with means through which a cooling medium may be circulated, said wall having a trough at its upper edge, means for pumping oil to said trough, and one or more passages leading oil from said trough to said radial bearing.

9. In a bearing, in combination with relatively movable thrust and radial bearing members, an oil well therefor, a wall located in said well, said wall being provided with means whereby a cooling medium may be circulated therethrough and having a trough at its upper edge, means for pumping oil to said trough to cause a portion of the oil to flow down said wall, and one or more passages whereby a portion of the oil from said trough flows to said radial bearing.

10. In a bearing, in combination with relatively movable thrust and radial bearing members, an oil well therefor, a wall located in said well and provided with means whereby a cooling medium may be circulated therethrough, said wall having passages for supplying a lubricant to said radial bearing, and means for pumping oil through said passages.

11. In a bearing, in combination with relatively movable thrust and radial bearing members, an oil well therefor, a wall located in said well and having passages for leading oil to and from said radial bearing, means for pumping oil through said passages, and means below said radial bearing members in the path of the oil flowing therefrom and providing a trough in direct communication with said passages through the wall for leading oil from said radial bearing members whereby the oil flowing from the radial bearing is deflected through said wall so that it will not mingle with oil flowing to the thrust bearing.

12. In a bearing, in combination with relatively rotatable thrust bearing members and an oil well therefor, means for pumping oil to a level above the surface of the oil in said well, and a plurality of upwardly inclined pans into which said oil flows from said pumping means and from which it flows in thin films back to said oil well.

13. In a bearing, in combination with relatively rotatable thrust bearing members and an oil well therefor, means for pumping oil to a level above the surface of the oil in said well, and a wall within said well provided with one or more circumferentially extending pans for receiving said oil and having inclined lower surfaces down which the oil will flow in thin films.

14. In a bearing, in combination with relatively rotatable thrust bearing members and an oil well therefor, means for pumping oil to a level above the surface of the oil in said well, a wall provided with one or more circumferentially extending pans for receiving said oil, said pans having inclined lower surfaces down which the oil will flow in thin films, and means for circulating a cooling medium in heat conducting relationship with said wall.

15. In a bearing, in combination with relatively rotatable thrust bearing members and an oil well therefor, means for pumping oil to a level above the surface of the oil in said well, and a housing for said bearing members provided with one or more inwardly extending pans for receiving said oil, said pans having inclined surfaces down which the oil will flow in thin films.

16. In a bearing, in combination with relatively rotatable thrust bearing members and an oil well therefor, means for pumping oil to a level above the surface of the oil in said well, a housing for said bearing members provided with external fins for inducing a circulation of air over said housing, and one or more pans extending inwardly from said housing above the surface of the oil in said well for receiving said oil and having inclined lower surfaces down which the oil will flow in thin films.

17. In a bearing, in combination with relatively rotatable thrust bearing members and an oil well therefor, means for pumping oil to a level above the surface of the oil in said well, a wall in said well over which the oil cascades and provided interiorly thereof with means for circulating water therethrough, said wall closely surrounding said bearing members whereby the main body of said oil is outside of said wall, and one or more fins projecting from said wall and immersed in the body of oil in said well.

18. In a bearing, in combination with relatively rotatable thrust bearing members and an oil well therefor, means for pumping oil to a level above the surface of the oil in said well, a wall in said well provided with means for circulating cooling water therethrough, and one or more pans projecting from said wall above the level of the oil in said well, said pans receiving the oil pumped upwardly by said pumping means and having inclined surfaces down which the oil will flow in relatively thin films.

19. In a bearing, in combination with relatively rotatable thrust bearing members and an oil well therefor, means for pumping oil to a level above the surface of the oil in said well, and a wall provided with inwardly extending pans above the surface of the oil in said well and inwardly extending fins projecting into the body of oil in said well, said pans receiving the oil pumped upwardly by said pumping means and having inclined lower surfaces down which the oil flows in thin films.

20. In a bearing, in combination with relatively rotatable thrust bearing members and a radial bearing associated therewith, a wall provided with one or more apertures, a channel-shaped pan mounted on said wall adjacent said apertures, said pan being disposed above said thrust bearing members and below said radial bearing to receive and deflect through said apertures and away from said thrust bearing members the oil passing through said radial bearing, and means for pumping oil to said bearing.

21. In a bearing, in combination with relatively rotatable thrust bearing members and a radial bearing associated therewith, a wall provided with one or more apertures, a pan mounted on said wall adjacent said apertures and below said radial bearing to receive and deflect through said apertures the oil passing through said bearing, and means for pumping oil to said bearing, said pan being provided with means for cooperation with an element of said bearing whereby said pan is properly positioned with respect to said apertures by the mounting of said bearing elements in operative position.

22. In a combined thrust and anti-friction bearing for a shaft provided with relatively rotatable thrust and anti-friction bearing members, in combination with a pot or housing for the thrust bearing, a wall having means interiorly of the same for cooling the oil in said pot or housing, said wall providing a support for the stationary member of the anti-friction bearing and being mounted within and on the base of said pot or housing.

23. In a combined thrust and anti-friction bearing for a shaft provided with relatively rotatable thrust and anti-friction bearing members, in combination with a pot or housing for the thrust bearing, a wall having means interiorly of the same for cooling the oil in said pot or housing, said wall providing a support for the stationary bearing member or the anti-friction bearing and being mounted within said pot or housing and closely surrounding the members of said thrust bearing.

24. A bearing provided with relatively rotatable bearing members, an oil well providing a body of oil in which the bearing surfaces are immersed, a vertical wall having a relatively continuous exterior surface over which the oil will cascade in a relatively thin film, means for pumping the hot oil which flows outwardly from the bearing surfaces directly to the top of said wall, and means interiorly of said wall for cooling the wall to abstract heat from the oil.

25. A bearing provided with relatively rotatable bearing members, an oil well providing a body of oil in which the bearing surfaces are immersed, a vertical wall in said well closely surrounding said bearing members whereby it is in heat interchanging relation with the oil immediately surrounding the bearing members, said wall having an exterior surface adapted to provide a cascade for the oil, means for pumping a portion of said oil to a level above said wall whereby said oil will flow in relatively thin films over said exterior surface on said wall to intermingle with said body of oil, and means interiorly of said wall for cooling its surface to lower the cascading oil to a temperature which will lower the average temperature of the body of oil to the desired temperature.

26. A bearing provided with relatively rotatable bearing members, an oil well providing a body of oil in which the bearing surfaces are immersed, a vertical wall having an exterior surface providing a cascade for the oil and closely surrounding said bearing members in heat conducting relation with the bearing members, means for pumping oil to the upper portion of said wall, and means for circulating a cooling medium through the interior of said wall for abstracting heat therefrom.

27. A bearing provided with relatively rotatable bearing members, an oil well providing said bearing with a body of oil in which the bearing surfaces are immersed, a vertical wall providing a plurality of vertically inclined surfaces over which said oil will cascade, means for pumping oil to a level above said surfaces, and means interiorly of said wall for cooling said surfaces over which the oil cascades to abstract heat from said oil.

28. A bearing provided with relatively rotatable bearing members, an oil well providing said bearing with a body of oil in which the bearing surfaces are immersed, a vertical wall surrounding said bearing members and providing a plurality of vertically inclined surfaces over which the oil will cascade, means for pumping the oil to a level above said wall and causing the oil to flow downwardly in a thin film over said surfaces, and means for circulating air in heat conducting relationship and with said wall to abstract heat therefrom.

29. A bearing provided with relatively rotatable bearing members, an oil well providing said bearing with a body of oil in which the bearing surfaces are immersed, means surrounding said bearing members and providing a plurality of vertically inclined surfaces over which the oil will cascade, means for pumping the oil to a level above said surfaces and causing the oil to flow downwardly in thin films over said surfaces, and means for circulating water and air in heat conducting relationship with said surfaces to abstract heat therefrom.

HARRY A. S. HOWARTH.